Dec. 24, 1968   C. M. EDWARDS   3,417,884
COMBINATION AGRICULTURAL IMPLEMENT
Filed April 28, 1967   5 Sheets-Sheet 1

CLARENCE M. EDWARDS
INVENTOR.

BY

ATTORNEY

CLARENCE M. EDWARDS
INVENTOR.

BY *John J. Chille*

ATTORNEY

Dec. 24, 1968     C. M. EDWARDS     3,417,884

COMBINATION AGRICULTURAL IMPLEMENT

Filed April 28, 1967     5 Sheets-Sheet 3

CLARENCE M. EDWARDS
INVENTOR.

BY

ATTORNEY

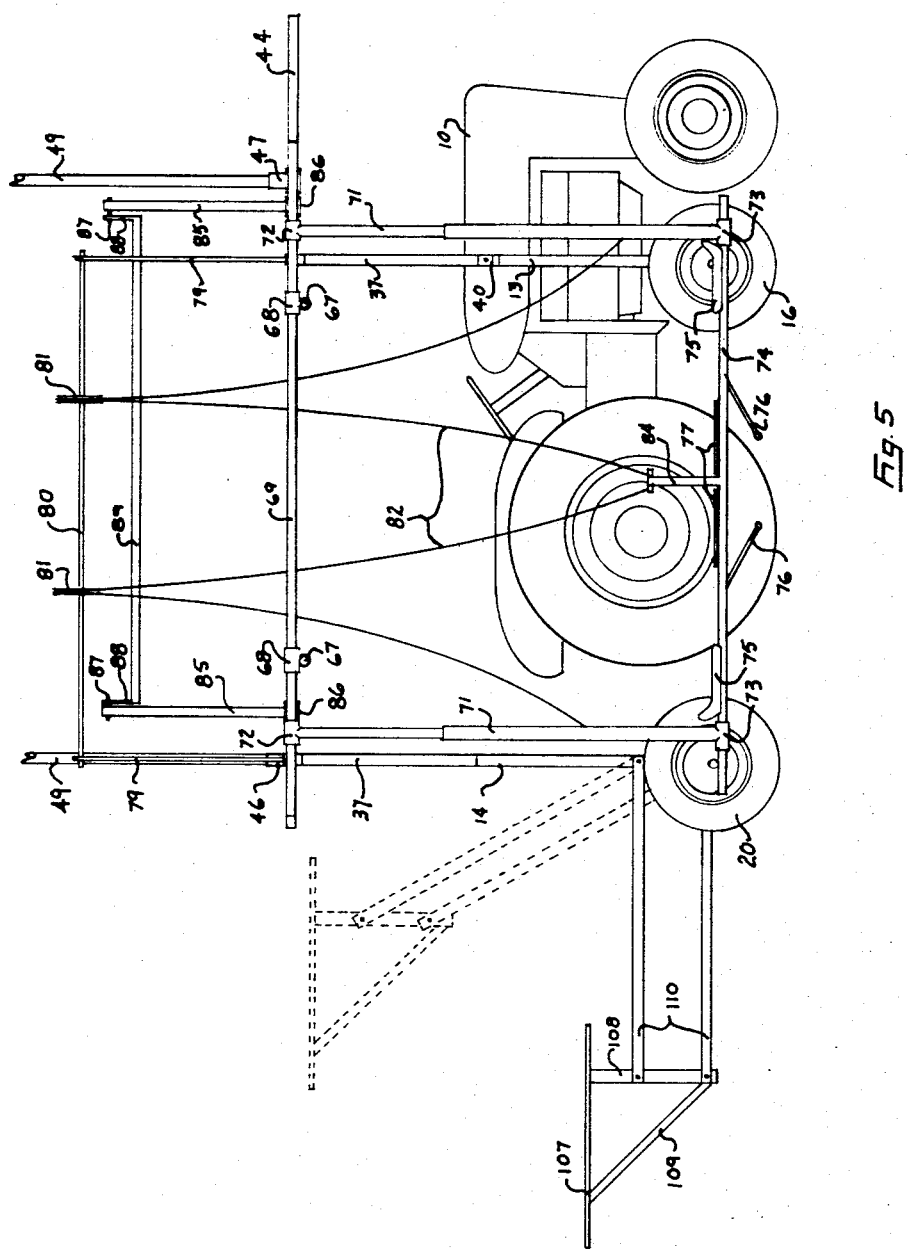

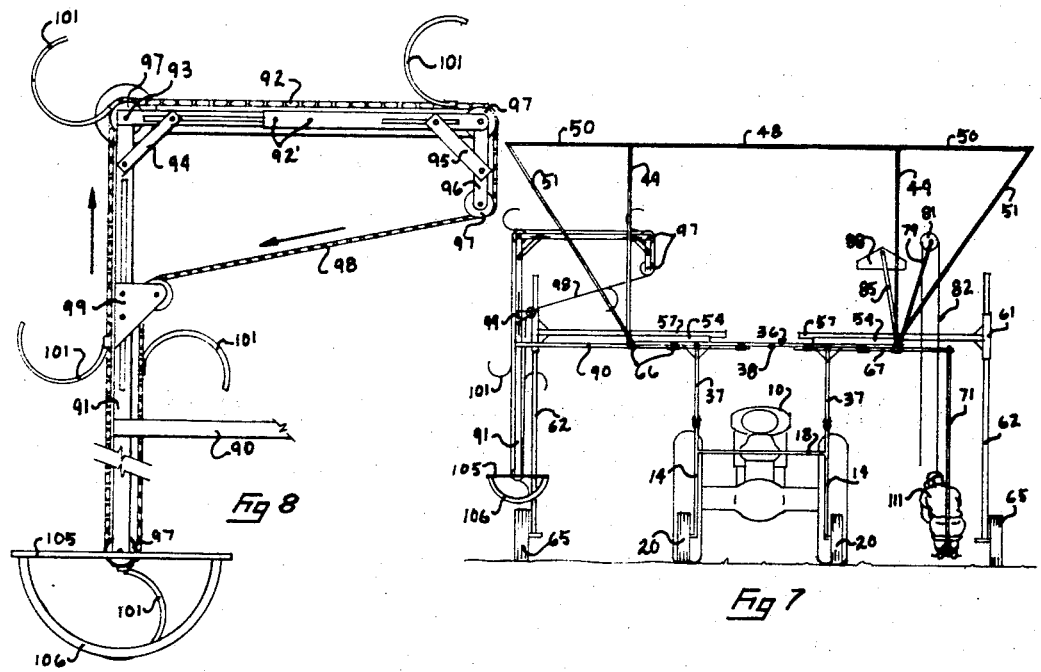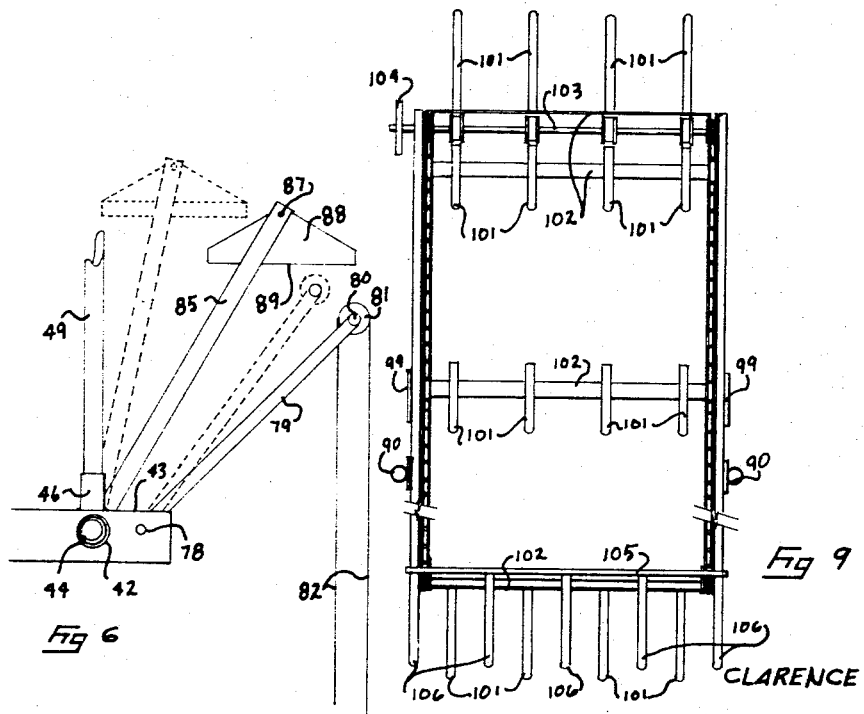

United States Patent Office 3,417,884
Patented Dec. 24, 1968

3,417,884
COMBINATION AGRICULTURAL IMPLEMENT
Clarence M. Edwards, Whitefield St.,
Knightdale, N.C. 27545
Filed Apr. 28, 1967, Ser. No. 634,619
11 Claims. (Cl. 214—83.1)

ABSTRACT OF THE DISCLOSURE

In abstract, a preferred embodiment of this invention is an agricultural implement witth a mounting frame onto which may be interchangeably connected an irrigation pipe carrier and a row crop, riding type, harvester rig including provision for a crop spray and dusting attachments.

---

This invention related to agricultural implements and more particularly to combination agricultural implements upon which a multiplicity of implement configurations may be used in conjunction with a single basic support frame.

In the past, during the crop growing season, irrigation pipes have been laid across the fields under cultivation to allow the same to be watered. Due to the cost of this pipe, it is usually moved from one field to another so that all of the crops may in turn be irrigated. Moving the pipe from storage to the field and from field to field has been done primarily by trailers attached to the rear of a tractor. This transportation method has been inadequate at best since the pipe is carried relatively low to the ground and whenever a turn is made, due to its length, it will engage the growing plants thereby damaging the same. The pipe may also become damaged due to collision action with trees and other relatively hard objects. A few vain attempts have been made to produce an irrigation pipe transport system other than the trailer method but none of these have been practical since, among other reasons, no means has ever been provided for adjusting the height of the carrying racks and the relationship of the pipe to the ground.

In addition to the above, various tractor mounted rigs have been devised to aid in the harvesting of row crops such as tobacco, cucumbers, tomatoes and the like. All of these rigs, however, are unitary in purpose and are not adapted for any other use except that for which they are specifically designed. Also if the tractor is to be used for other farming purposes, the entire rig must be disassembled from the tractor itself and the new rig attached thereto. In addition to the great expense involved in purchasing and maintaining the numerous types of rigs required in modern farming operations, the inconvenience and costly time consuming job of unrigging and rerigging a tractor for the various operations required in a single work day are extremely burdensome at best. This is particularly true for the smaller farmer who cannot afford to maintain a multiplicity of tractors and single purpose farming rigs.

The present invention has been developed after much research and study into the above mentioned problems and is designed to provide a single, easily mountable and dismountable, tractor attached basic frame adapted to readily receive a multiplicity of labor and time saving attachments which are easily and quickly converted from one to another. This combination implement has the distinct advantage of allowing the purchase of a single operable rig for accomplishing a desired purpose and at a later time, whenever the need arises and the funds are available, to add to the basic rig other types of farm equipment which fit the basic frame included with the original implement. Thus a substantial savings may be had since the basic frame need not be purchased with the additional implements acquired.

It is, therefore, an object of the present invention to provide a combination agricultural implement so designed to be adaptable to transport irrigation pipe in an elevated, adjustable position relative to the earth and transporting tractor.

Another object of the present invention is to provide a row crop, riding type, harvester rig adapted to be readily operatively attached and detached from a basic implement frame operatively mounted on a carrying tractor.

Another object of the present invention is to provide, in a combination agricultural implement, a hand conveyor means for transferring picked row crops to a sorting and packing area.

A further object of the present invention is to provide, in a combination agricultural implement, an improved mechanical conveyor means for moving a picked crop from the harvesting area to a sorting and packing area.

Another object of the present invention is to provide, in a combination agricultural implement, a means for moving containers and the like into a packing and storing area and removing the sorted and packed crops and the like therefrom.

Another object of the present invention is to provide, in a combination agricultural implement, a crop insecticidal type spray and dusting rig mounting which is vertically adjustable thereby aiding in the proper application of the spray and dust.

An additional object of the present invention is to provide, in combination, an irrigation pipe conveying rig, a hand conveyor for a row type crop harvester, a mechanical conveyor means for a row type harvester, a loading and unloading elevator type means for a row type harvester, and a vertically adjustable crop spray and dusting platform means all of which are adapted to be easily connected to and disconnected from a basic tractor mounted from a basic tractor mounted frame.

Other objects and advantages of the present invention will become apparent and obvious from a study of the following description and the accompanying drawings which are merely illustrative of the present invention.

In the drawings:

FIG. 5 is a side elevational view of the combination agricultural implement of the present invention including the hand operated conveyor means and the elevator means;

FIG. 6 is an enlarged end view of the hand conveyor means and adjustable sorting platform means;

FIG. 7 is a rear, end view of the harvester unit showing both the hand conveyor means and the mechanical conveyor means in operative position;

FIG. 8 is an enlarged end view of the mechanical conveyor means; and

FIG. 9 is a side elevational view of one embodiment of the mechanical conveyor means.

Figure 1:
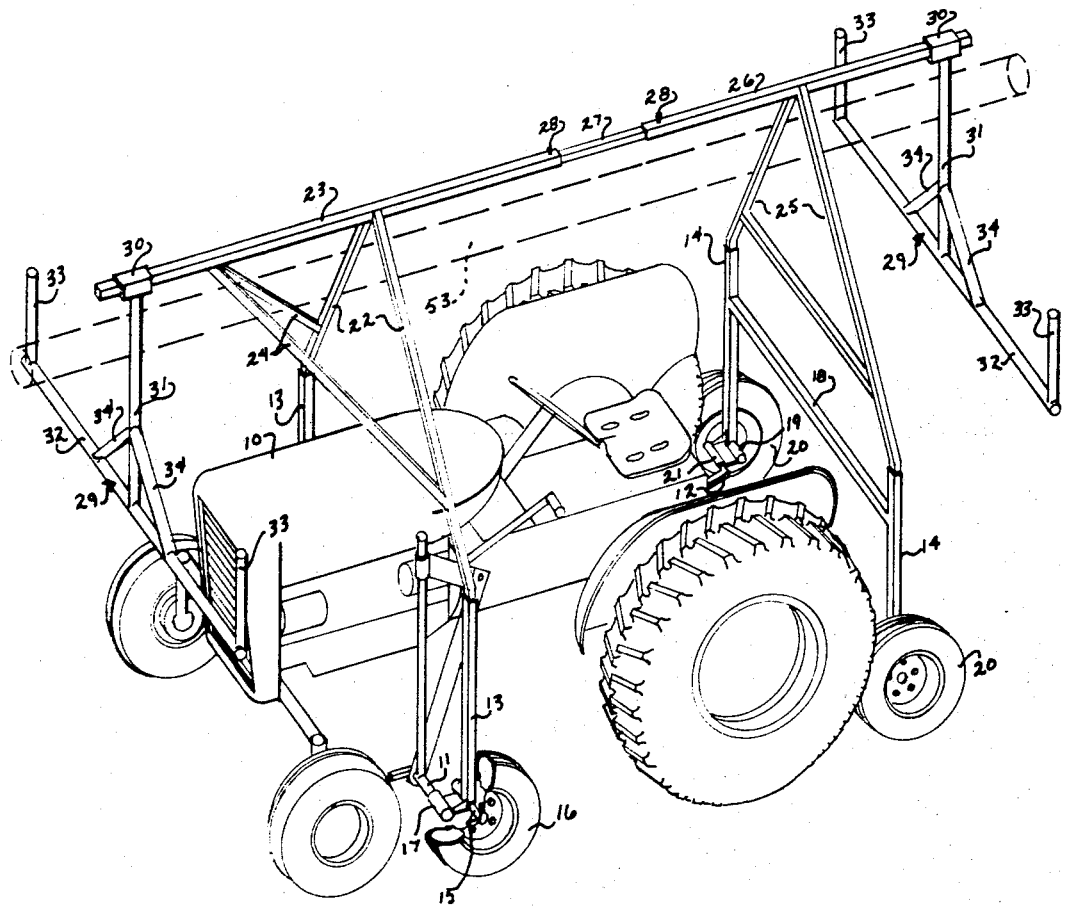
FIG. 1 is a perspective of a tractor having the basic frame unit of the present invention mounted thereon in combination with an irrigation pipe transporting rig.

With further reference to the drawings, FIG. 1 discloses a tractor 10 equipped with standard forward hydraulic lift means 11 and rear hydraulic lift means 12. Although these lift means vary from one type of tractor to another, the load bearing ends thereof are of a universal size. Both the forward and ear lift means are paired on either side of the tractor 10.

A pair of parallel vertically disposed forward support frames 13 and 14 are provided, one on each side of the tractor. A laterally projecting horizontally disposed axle 15 is fixedly secured to the lower portion of each of the forward support frames 13 and 14. On each of these axles is rotatively mounted forward support wheels 16. Forward of and parallel to each of the axles 15 in the horizontal plane therewith is a sleeve 17 adapted to slideably engage forward hydraulic lift means 11.

A pair of vertically disposed rear support frames 14 are provided which are joined in their upper portion by cross support 18. A pair of laterally disposed horizontal axles 19 are fixedly secured to the lower portions of each of the rear support frames 14. Rotatively mounted on each of the axles 19 are rear support wheels 20. Parallel to and in the same horizontal plane with axles 19 are sleeves 21 which are adapted to slideably engage rear hydraulic means 12.

The upper portions of each of the forward and rear support frames 13 and 14 have an open interior and are adapted to slideably receive portions of various agricultural implements as will be hereinafter described.

Whenever it is desired to carry irrigation pipe, logs or similar elongated objects on a tractor using the concept of the present invention, the downwardly disposed parallel end portions of inverted V-shaped forward frame 22 are inserted into the openings in the upper portions of forward support frames 13. Fixedly secured to the apex of forward V-shaped frame 22 is a hollow generally horizontal forward support member 23 disposed parallel to the longitudinal axes of the tractor 10. A V-shaped brace 24 is fixedly secured at its apex to support member 23 and each of its end portions is fixedly secured to either side of the V-shaped forward frame 22.

The parallel downwardly projecting end portions of A-frame 25 are adapted to slideably mount within the upper portions of rear support frames 14. Fixedly secured to the apex of A-frame 25 is a generally horizontally disposed hollow rear support member 26.

A center support member 27 is adapted to be slideably received into forward and rear support members 23 and 26. To releasably secure these last three mentioned support members during the use of the implement, a pair of set screws or similar means 28 may be provided.

Once the three support members 23, 26 and 27 have been adjustably mounted in their correct position above the tractor 10, a pipe support hanger indicated generally at 29 may be adjustably secured on the forward end of support member 23. This hanger is composed of a sleeve 30 which has fixedly secured thereto a downwardly projecting support 31 which in turn is fixedly secured to horizontally disposed cross arm 32. On each end of this cross arm is fixedly secured upwardly projecting retainers 33. To add strength to the joint between downwardly projecting support 31 and cross arm 32, a pair of braces 34 may be fixedly secured therebetween.

A second pipe support hanger identical to the hanger hereinabove described is provided which is slideably mounted on the rear portion of rear support member 26.

As will be noted from FIG. 1 as the load of irrigation pipe or other elongated objects 53 are loaded upon the carrier, they will stack in such a manner as to be supported by both the pipe support hangers 29 and the forward and rear frames 22 and 25.

Whenever it is desired to convert the tractor 10 of an irrigation or similar type carrier to a harvester, the support hangers 29 can be removed from support members 23 and 26. The center support member 27 may be removed from the forward and rear support members 23 and 26 thereby leaving frames 22 and 25 and their associated parts to be lifted upward to remove them from their associated frames 13 and 14 respectively.

The basic frames mounted on the forward and rear hydraulic lifts are now ready to receive forward platform support indicated generally at 35 and rear platform support indicated generally at 36. Support 35 has a pair of downwardly projecting members 37 which are fixedly secured at their upper portion to cross member 38. A set of braces 39 are provided between members 37 and 38.

Pivotably secured to the lower end of downwardly projecting members 37 are yokes 40 which are in turn fixedly secured to members 41 which are adapted to slideably engage support frames 13. The purpose for the pivotable relationship between members 41 and 37 is to prevent binding when the forward and rear lift systems of the tractor are activated unevenly or when only one of these units is activated to level the platform above supports 35 and 36. It should be understood, of course, that a pivoted means of the type just described could be also applied to the lower portion of rear platform support 36 or could be used in conjunction with both supports 35 and 36.

Rear platform support 36 is identical to forward support 35 as hereinabove described in detail with the exception that the downwardly projecting members 37 are slideably received within the rear support frame 14 rather than having the yoke and slide member as used with forward frames 13. Reference numbers to equivalent parts of platform support 35 are indicated for platform support 36.

Fixedly secured perpendicularly to cross members 38 in a generally horizontal plane are rod receiving sleeves 42. At each end of each of the cross members 38 is a pocket 43 which is opened at its top and is adapted to receive a pin through opening 43' as will be hereinafter described.

Figure 2:
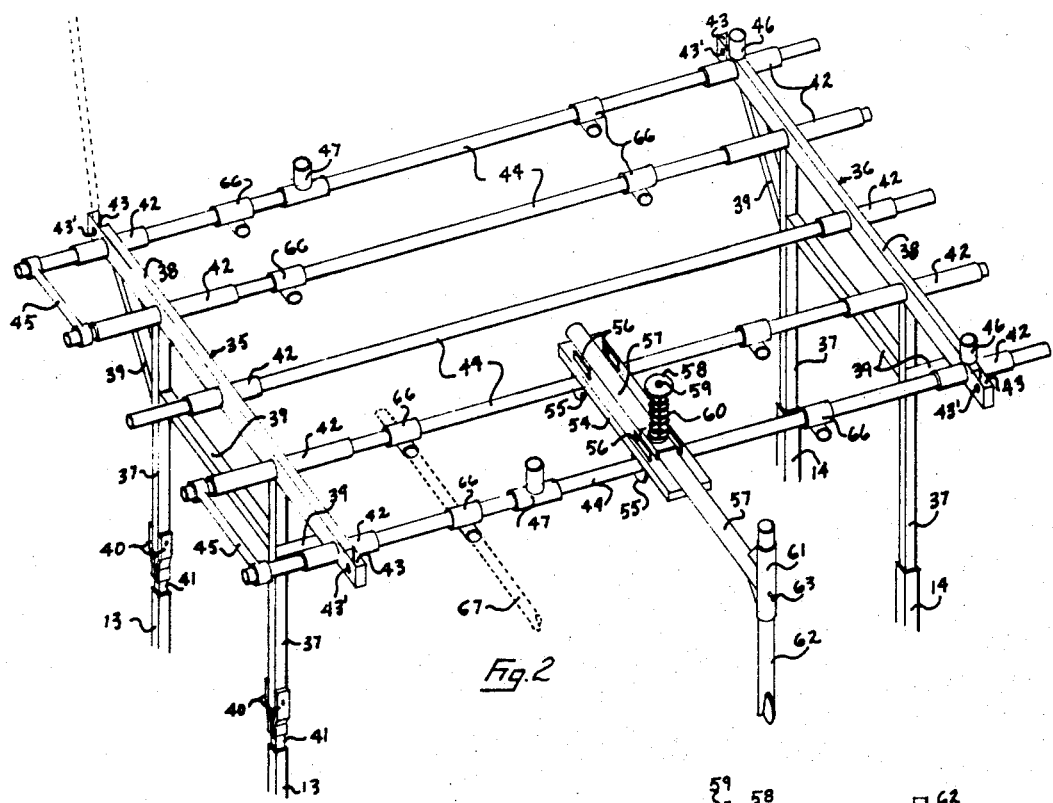
FIG. 2 is a perspective of the basic harvester frame as mounted on the basic tractor frame.
Figure 3:
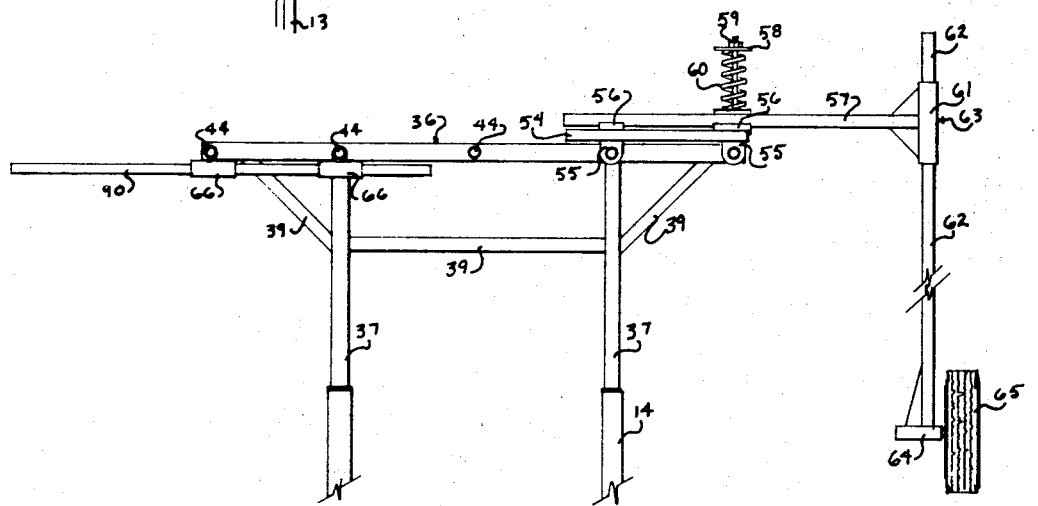
Fig. 3 is an end view of the basic harvester frame showing the mounting of an outrigger wheel thereon.

A series of rods 44 are provided which are adapted to be slideably received by rod sleeves 42 of platform supports 35 and 36. To give additional support to these rods, particularly when they are outwardly projecting some distance, a series of connector arms 45 may be used which have a rod receiving sleeve on either end thereof. Although only two of these arms are illustrated in FIG. 2, it is to be understood that any number of them may be used to join part or all of the rods 44 together, either at one end or at both ends.

Fixedly secured to the upper portion of cross member 38 of rear platform support 36, just inwardly of pockets 43, are a pair of upwardly extending sun cover support sockets 46. A T-shaped forward sun cover support 47 is provided which is slideably mounted on each of the outside rods 44. Each of these supports contains an upwardly projecting socket to receive the sun cover frame.

To provide a sun cover for the implement of the present invention, a rectangular shaped upper frame 48 is provided having downwardly projecting support members 49 at each of its corners. The rear two support members 49 are adapted to be received within sockets 46 while the two forward support members 49 are adapted to be slideably received within cover supports 47.

M-shaped frame member 50 is swingably mounted on either side of rectangular frame 48 in such a manner that they may be folded in an overlapping fashion above frame 48 or may be unfolded to extend outwardly to increase the area that may be covered with a sun cover (not shown). To maintain frame 50 in extended position, pivotably mounted supports 51 are provided at either end thereof. Each of these supports 51 has a semi-cylindrical base 52 fixedly secured thereto and adapted to bracingly rest against each of the outermost rods 44. The compactness of the folding between frames 48 and 50 and supports 51 is clearly shown in FIG. 4 which indicates one of the two frames 50 as being extended while the other is in the folded position.

To give added support and for safety reasons, a removable outrigger means may be provided. A manner of accomplishing this is to provide a support plate 54 having fixedly secured thereto at least two downwardly projecting tabs 55. Each of these tabs has an opening therein to receive rods 44. Two pairs of upwardly projecting tabs are provided in such a manner as to act as a cradle for the laterally projecting outrigger arm 57. A bolt means 58 is fixedly secured at its lower end to support plate 54 and passes through outrigger arm 57 and terminates in a bearing plate 58 with a tension adjusting nut 59 attached thereto. Between outrigger arm 57 and bearing plate 58 is a tension means such as a coil spring which biases the said outrigger arm 57 into the cradle formed by tabs 56 while at the same time allowing the upward movement of said outrigger arm upon the exertion of an upward force of adequate strength to compress spring 60.

A vertically disposed sleeve 61 is fixedly secured to the outer end of outrigger arm 57. A generally vertically disposed wheel support arm 62 is slideably mounted through sleeve 61. To adjustably secure arm 62 within sleeve 61, a means such as a set screw 63 may be provided.

Fixedly secured to the lower end of wheel support arm 62 is a horizontally disposed, laterally extending axle 64 upon which is rotatively mounted a wheel 65.

A series of angular rod supports 66 are slideably mounted on rods 44 and are adapted to slideably receive laterally disposed rods 67. Sleeve supports 68 of similar construction to sleeve supports 66 are mounted on the outboard end of rods 67 and are adapted to slideably receive longitudinally disposed occupant supporting rods 69 which are generally parallely disposed to rods 44 and in the same horizontal plane therewith.

A pair of vertically disposed telescopically adjustable spaced occupant support members 71 are provided which have perpendicularly disposed sleeves 72 fixedly secured to the upper end thereof and adapted to slideably mount upon rod 69. Sleeves 73 are fixedly secured to the lower end of occupant support members 71 and are adapted to slideably receive base member 74.

A pair of facing seats 75 are provided for the workers using the present invention to harvest a row crop. A pair of angularly disposed, downwardly projecting foot rest means 76 are provided along with a small table or platform 77. It will be obvious, particularly from FIG. 5, that the height above the ground of the workers sitting in seats 75 may be adjusted by either lengthening or shortening support members 71 or by raising or lowering the entire harvester rig through the use of the forward and rear hydraulic lift systems of the tractor.

In the interest of clarity, FIG. 5 is shown with the harvester using only the manual conveyor means as will be hereinafter described and without outrigger wheel 65 and its associated parts.

Adapted to be pivotably mounted on pins 78 within pockets 43 on each side of platform supports 35 and 36 are pulley support arms 79. Communicating between and fixedly secured to the upper end of each pair of support arms 79 is a pulley axle 80. Two or more pulley wheels 81 may be slideably and rotatively mounted on axle 80. A hoist line 82 is provided in operative relation to each of the pulleys 81. A hook means 83 is fixedly secured to one end of the hoist line and is adapted to be releasably held in convenient reach of workers sitting in seats 75 by upright hook retainer 84.

Plywood, fiberboard, lumber, sheet metal or the like may be used to span the distance between rods 44 thereby forming a platform (not shown) above such rods.

A pair of sorting table support members 85 may be provided having a sleeve 86 perpendicularly secured to the lower end thereof in such a manner as to receive one of the rods 44. At the opposite end of member 85 from sleeve 86 is a pin 87 which pivotably mounts the upwardly extending end portions 88 of sorting table 89. Due to this particular construction, the sorting table will remain level even though the support members are moved from one position to another, particularly as disclosed in FIG. 6. The relative height between the sorting table 89 and the pulley 81 may, of course, be determined by the needs of the people using the combination implement of the present invention by either extending or shortening a relative length of support members 79 and 85. This may be particularly noted in FIG. 6 where support member 79 is shorter than member 85 while in FIG. 7 member 79 is longer than member 85.

If the hoist line type manual conveyor is not adaptable to the crop being harvested or it is inconvenient or cumbersome to use, a mechanical conveyor may be operatively connected to the harvester rig in a manner similar to the means of mounting the worker riding means by utilizing sleeves 66 and by passing a rod 90 therethrough which at its outermost end is fixedly secured to the vertical conveyor support 91. A generally horizontally disposed conveyor support 92 is provided at an adjustable angle through pivot point 93 and brace 94, which is slideably mounted on one end to said support 92 and is pivotably mounted to support 91. An adjustable support bracket 95, similar in operation to bracket 95, similar in operation to bracket 94, adjustably controls the angle at which depending member 96 is maintained relative to member 92. Member 92 is slotted along a portion of its length in such a manner that it is adjustably extensible through the loosening and tightening of means such as bolts 92′.

At the lower end of member 91, at the apex of members 91 and 92, at the apex of members 92 and 96, and at the end of member 96 are sprockets 97 adapted to operatively carry chain 98. Once the angles between the various support members have been set for proper height and operating angle, idler sprocket assembly 99 may be slideably adjusted either up or down on member 91 to obtain proper operating tension on the chain 98.

A series of tines 101 are fixedly secured to cross members 102 which are in turn secured to the inner edge of the two parallely disposed chain drives 98 as hereinabove described. Both of these chains are driven in unison by drive shaft 103 upon which is fixedly secured the sprockets 97 adjacent brackets 94. A pulley 104 is fixedly secured to the end of shaft 103 and may be driven by any convenient source of rotative power such as manual operation, the power take-off of the tractor 10 or the like.

Fixedly secured to the lower portion of member 91 is a rectangular rim 105 having a series of bails 106 depending therefrom and so placed that tines 101 will alternately pass between the bails 106 particularly as disclosed in FIG. 9.

It is within the contemplation of this invention, if desired, to remove bails 106 and to provide between the outermost tines, on either side of the center of the mechanical conveyor, a basket means so that the worker harvesting the crop can place the picked crop directly in the basket which will convey it to the platform area of harvester. The center portion of each basket will remain open as is in the case with the tines since support arm 62 of outrigger wheel 65 is preferably mounted within this area.

Since the sorting table 89 may be adjustably mounted on any of the rods 44, if desirable, such table may be mounted adjacent or beneath member 96 thereby allowing the harvested crop to be automatically dumped onto the sorting table as each set of tines or basket makes its trip from the lower end of member 91 to the vertically disposed member 96. Likewise, if hand unloading is desirable of sets of tines 101 or the baskets as hereinabove described, these units may be reversed from that shown in the figures and the travel of the chain reversed from that indicated thereby giving the operator standing on the platform of the harvester time to unload the said tines or baskets as the same travels upward along member 96.

To move personnel and equipment from the ground to the platform level and to bring the sorted and/or packaged harvested crops from the platform to the ground, an elevator may be provided having a platform 107 with an undercarriage composed of downwardly projecting support 108 and brace 109. To the support 108 of the undercarriage are pivotably mounted a pair of parallely disposed arms 110 which are pivotably secured at their opposite ends to rear support frame 14. For strength, a second undercarriage should be provided for connection with a second set of arms to the second rear support frame 14 with the platform 107 extending therebetween even though this is not shown specifically in the drawings.

From the above description, it is obvious that when force is exerted to move platform 107 forward the same will automatically move in an upward direction until it comes into contact with the rear portion of platform supporting rods 44. The forward and thus upward movement and the rearward and thus lowering movement of platform 107 may be accomplished by connecting the same to the tractor hydraulic system or through a series of pulleys and chains to the power take-off of the tractor or could actually be hand operated or operated through the use of a separate motor or similar means. Similarly, if it is desirable to remove the elevator platform and its associated parts from the frames 14, the pivot means at the forward end of arms 110 may be removed thereby allowing the entire elevator rig to be removed.

With either the irrigation hauling rig or one of the modifications of the harvester still connected to the tractor, the elevator including platform 107 may be used as a height adjusting and supporting means for a crop sprayer or duster unit since such unit could easily be placed on platform 107.

In actual use of the combination agricultural implement of the present invention, the irrigation pipe hauling rig may be attached to the basic frame on the tractor so that such pipe may be moved across fields of growing crops without damaging such crops since the height and level of the pipe may be constantly adjusted according to requirements through the use of the tractor forward and rear hydraulic lift systems. Once the need of the pipe carrying rig is terminated, then the elevator including platform 107 could be attached to the rear frame members and the tractor could immediately be used for crop dusting or crop spraying of insecticides, fungicides, herbicides and the like. This spraying or dusting operation could be very efficiently carried out in that the height of the spray or dust rig above the growing crop can be constantly and accurately adjusted to the varying height of such crop. This is true even though the crop is extremely tall and full grown such as corn. When the necessity arises to use a harvester rig rather than the irrigation hauling rig, the latter may be very easily removed from the basic frame as hereinabove described Now the basic harvester frame and platform may be operatively connected to the basic frames 14 and 15 by placing platform supports 35 and 36 in connection with frames 13 and 14 respectively. Rods 44 are then placed through sleeves 42 and the platform as hereinabove described may be placed thereon. Next connector arms 45 may be used if desired or felt necessary to strengthen the outwardly extending portions of the rods 44. As the rods 44 are put in place, either the hereinabove described mechanical conveyor or the manual conveyor system or both may be attached to the harvester rig. Also the worker support means may at this point be connected on either side of the harvester as hereinabove described.

Although not absolutely necessary, the outrigger wheels 65 may be operatively connected to the harvester in such spaced relation that they will ride in the same area between the rows as the worker rides. As the now rigged harvesting device is moved across the field to be harvested, the workers 111 riding in seats 75 will pick the crop and if the mechanical system is being used will place it in the basket like container formed by rim 105 and bails 106. As the conveyor chain 98 moves, the tines 101 will pick up any harvested crop in the said container and carry it up along member 91 and over to the platform area where another worker may either remove it or have it automatically fall into a container as the tines 101 pass down along support 96. Since a number of tines are placed on chain 98, this is a continuing automatic pick-up and delivery process from the harvester workers 111 position to the sorter and packer workers (not shown) position.

If the manual conveyor system of the present invention is used, the hooks 83 on hoist line 82 are secured to hook retainer 84 while a container (not shown) resting on platform or table 77 is filled by the workers 111 riding in seats 75. As soon as one of these workers has his container full, he hooks it to hoist line 82 and by pulling on the end opposite hook 83 will move it into the area adjacent assorting table 89 from which a worker (not shown) standing on the platform may remove the harvested crop for sorting, packing, tying or otherwise processing. As the processed crop is accumulated on the platform, the elevator device may be used to periodically lower it to either a trailer (not shown) being pulled by the tractor or into the middle row down which the tractor is traveling for a later pick-up.

If desirable, the tables 77 may pivoted at their ends away from the seat 75 so that the worker 111 may have easier excess to his riding position and foot rest 76.

Figure 4:
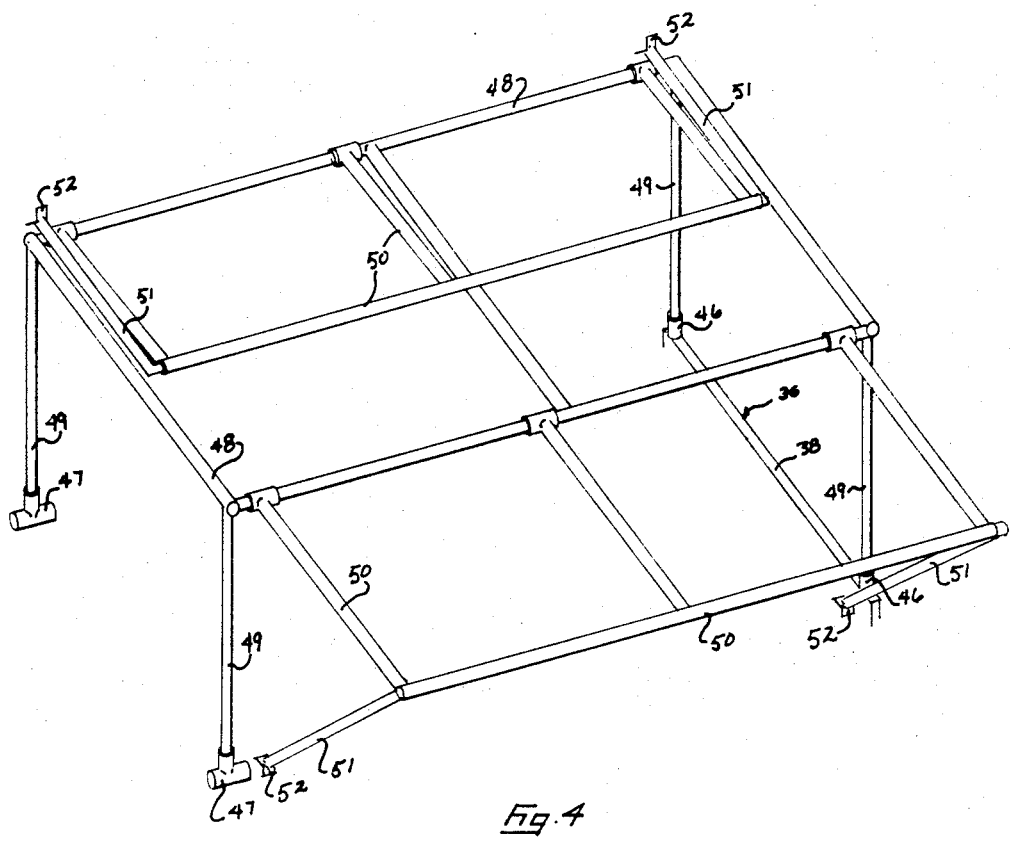
FIG. 4 is a perspective of one type of sun cover frame which may be used in conjunction with the basic harvester frame.

If the weather is sunny or for rain protection, the cover frame as hereinabove described in connection with FIG. 4 may be connected to the harvester so as not only to protect the workers on the platform but also to protect the workers 111 riding in the seats 75 on both sides of the harvester rig.

If the harvester of the present invention is being used in conjunction with tobacco priming, an automatic tying machine such as the commercially available Norfolk Hawk manufactured by the Eagle Tying Machine Company of London, England, could be mounted on the platform so that the workers thereon could tie the tobacco as it is primed to tobacco sticks and stack the same for direct conveyance into the tobacco barn upon completion of the priming process.

As soon as the harvesting of the desired crop using the harvester rig of the present invention has been completed, the entire rig could be very easily removed from the tractor so that the latter may be used for other farming purposes while either leaving or removing the basic frames 13 and 14.

It is obvious from the above description and the accompanying drawings that the present invention has the advantage of allowing a multiplicity of farm implements and uses to be purchased and operated by a farmer owning only one tractor while at the same time providing superior equipment than is presently available to accomplish the jobs anticipated for each rig. The combination agricultural implement of the present invention further has the advantage of allowing a farmer to purchase only the basic unit and the attaching rigs that he needs immediately with the option of later purchasing any additional equipment which he may desire or have the need for.

The terms "upper," "lower," "front," "rear," "horizontal," "vertical" and so forth have been used herein merely for the convenience of the foregoing specification and in the appended claims to describe the combination agricultural implement and its parts as oriented in the drawings. It is to be understood, however, that these terms are in no way limiting to the invention since the implement may obviously be disposed in many different positions when it is in use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. In a combination agricultural implement including a tractor type vehicle having a forward lift means outwardly extending on each side of said tractor and a rear lift means outwardly extending on either side of said tractor, the improvement comprising: a pair of vertical disposed forward frame means; horizontally disposed sleeve means fixedly secured to the lower portion of said frames and adapted to releasably receive said outwardly extending forward lift means; and axle means parallely disposed to said sleeve means and fixedly secured to the lower portion of said frame means; auxiliary support wheel means mounted on said axle means; a pair of vertically disposed rear frame means; horizontally disposed sleeve means fixedly secured to the lower portion of said rear frames and adapted to releasably receive said outwardly extending rear lift means; an axle means parallely disposed to said last mentioned sleeve means and fixedly secured to the lower portion of said rear frame means; auxiliary support wheel means mounted on said last mentioned axle means; means for supporting elongated objects during transport operatively and removably attached to the upper portions of said forward and rear frame means; and crop harvester means adapted to substitutionally replace said support means whereby a combination agricultural implement may be provided.

2. The combination agricultural implement of claim 1 wherein the support means includes an inverted V-shaped frame adapted to releasably attach to said forward frame means; a longitudinally extending horizontally disposed support means fixedly secured to the apex of said V frame; an A-shaped frame adapted to releasably engage said rear frame means; a longitudinally extending horizontally disposed rear support means fixedly secured to the apex of said A frame; means for adjustably connecting said forward support means and said rear support means; a forward load support hanger removably secured to said forward support means; and a rear load support hanger removably secured to said rear support means whereby a multiplicity of elongated objects may be supported between said forward and rear hangers and thereby transported by said tractor.

3. The combination agricultural implement of claim 1 wherein the crop harvester means includes a π-shaped forward platform support means having its lower portion adapted to releasably attach to said forward frame means; a π-shaped rear platform support means adapted to have its lower portion releasably attached to said rear frame means; a series of parallel longitudinally extending horizontally disposed rod means releasably secured at spaced intervals along the upper portion of said forward and rear platform support means; laterally extending support rod means slideably attached to said platform support rods; means for suspendingly attaching a seat to said laterally extending rod means whereby a worker may be transported across a field during the harvesting of a crop.

4. The combination agricultural implement of claim 3 wherein there is included a horizontally disposed laterally extending outrigger arm releasably secured to at least two of said longitudinally extending rods; a vertically disposed wheel support arm adjustably secured to the outer end of said outrigger arm; an outrigger wheel rotatively mounted on the lower end of said support arm and adapted to supportingly engage the ground adjacent said tractor type vehicle; and spring biasing means associated with said outrigger arm whereby variations in the contour of the earth between said tractor type vehicle and said outrigger wheel may be compensated for.

5. The combination agricultural implement of claim 4 wherein the biasing means includes a support plate releasably mounted between at least two of said longitudinally extending rods and having a cradle means adapted to fittingly receive said outrigger arm; an upwardly projecting bolt means fixedly secured to said plate and extending through said arm; and a spring means biased between the upper end of said bolt and said outrigger arm whereby said arm is maintained in contactive relation with said plate until upward pressure from said wheel overcomes the tension of said spring.

6. The combination agricultural implement of claim 4 wherein the biasing means includes a support plate releasably mounted between the last two of said longitudinally extending rods and having a cradle means adapted to fittingly receive said outrigger arm; a pair of upwardly projecting bolt means fixedly secured to said plate on either side of said cradle so as to straddle said arm; a connector means adjustably secured between the upper ends of said bolt means; and a spring means biased between said connector means and said outrigger arm whereby said arm is maintained in a contactive relation with said plate until upward pressure from said wheel overcomes the tension of said spring.

7. The combination agricultural implement of claim 3 wherein there is included a platform restingly supported by said longitudinally extending rods; an upwardly extending pulley support arm releasably attached to one of said rods; a pulley means rotatively mounted on the upper end of said arm; and a hoist line means extending from said seat over said pulley and back to said seat whereby as a crop is harvested it may be transferred from the area adjacent the seat to the area adjacent the platform.

8. The combination agricultural implement of claim 3 wherein there is included a platform restingly supported by said longitudinally extending rods; a pair of upwardly projecting table support members adjustably attached to one of said longitudinally extending rods; a table means having upwardly projecting end means; and pivot means connecting each of said support members to the end means of said table whereby a self-leveling adjustable table may be provided in the area above the platform.

9. The combination agricultural implement of claim 1 wherein in conjunction with said harvester means a conveyor is provided including a vertically disposed conveyor support; means for supportingly connecting said vertical support to said harvester; a horizontally disposed support adjustably secured at one end to the upper end of said vertical support; a depending support adjustably secured to the end of said horizontal support opposite said vertical support; a series of sprocket type pulley means located one each at the lower portion of said vertical support, the apex of said vertical support and said horizontal support, the apex of said horizontal support and said depending support, and the lower end of said depending support; an idler sprocket type pulley means slideably adjustable on said vertical support; a chain type endless belt operatively connecting all of the above mentioned pulleys; a series of outwardly projecting tine like fingers fixedly secured at spaced intervals along said belt; and means for driving said belt whereby harvested crops may be transported from one portion of said harvester to another.

10. The combination agricultural implement of claim 7 wherein a series of baskets are substituted for said tine like fingers.

11. The combination agricultural implement of claim 1 wherein there is included at least one set of parallely disposed arms pivotably attached at one end thereof at spaced intervals to at least one of said rear frame means; a vertically disposed support means pivotably connected between the other end of said parallely disposed arms; a horizontally disposed platform fixedly secured to the upper end of said vertically disposed support; and means to move said platform forward and rearwardly whereby said platform may be raised and lowered.

References Cited

UNITED STATES PATENTS 2,095,007  10/1957  Pfister.
3,223,444  12/1965  Tart _____ 280—83.1 XR ALBERT J. MAKAY, *Primary Examiner.*

U.S. Cl. X.R.

280—32.5, 150